(12) United States Patent
Sato

(10) Patent No.: US 11,582,357 B2
(45) Date of Patent: Feb. 14, 2023

(54) INFORMATION PROCESSING APPARATUS FOR IMPROVING TECHNIQUES FOR LOGGING INTO AN EXTERNAL DEVICE, CONTROL METHOD THEREFOR, AND STORAGE MEDIUM

(71) Applicant: CANON KABUSHIKI KAISHA, Tokyo (JP)

(72) Inventor: Masaaki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/469,722

(22) Filed: Sep. 8, 2021

(65) Prior Publication Data

US 2022/0086290 A1 Mar. 17, 2022

(30) Foreign Application Priority Data

Sep. 14, 2020 (JP) .............................. JP2020-154019

(51) Int. Cl.
*H04N 1/00* (2006.01)
*H04N 1/44* (2006.01)
*H04W 4/80* (2018.01)

(52) U.S. Cl.
CPC ..... *H04N 1/00342* (2013.01); *H04N 1/00307* (2013.01); *H04N 1/00413* (2013.01); *H04N 1/4413* (2013.01); *H04N 1/4433* (2013.01); *H04W 4/80* (2018.02); *H04N 2201/006* (2013.01)

(58) Field of Classification Search
None
See application file for complete search history.

(56) References Cited

U.S. PATENT DOCUMENTS

| | | | | |
|---|---|---|---|---|
| 9,794,426 | B2* | 10/2017 | Kurihara | ............ H04N 1/00493 |
| 2016/0261975 | A1* | 9/2016 | Kurihara | ................. H02J 50/10 |
| 2017/0264758 | A1* | 9/2017 | Naito | .................... H04W 12/50 |
| 2018/0335993 | A1* | 11/2018 | Kanai | ................... G06F 3/1204 |
| 2018/0341841 | A1* | 11/2018 | Tokumoto | ........... H04W 12/068 |
| 2018/0343351 | A1* | 11/2018 | Kurihara | ............... G06F 3/1236 |
| 2019/0129664 | A1* | 5/2019 | Kawasaki | ............ G06F 3/1204 |
| 2020/0019355 | A1* | 1/2020 | Kimura | .............. H04N 1/00411 |

FOREIGN PATENT DOCUMENTS

JP 4504378 B2 7/2010
JP 2013157736 A 8/2013

* cited by examiner

*Primary Examiner* — Henok Shiferaw
(74) *Attorney, Agent, or Firm* — Canon U.S.A., Inc. IP Division

(57) ABSTRACT

An information processing apparatus transmits a login request for logging into an external device to the external device, based on a short-range wireless communication being established between the information processing apparatus and the external device in a state where an application is operating in a background state on the information processing apparatus.

30 Claims, 10 Drawing Sheets

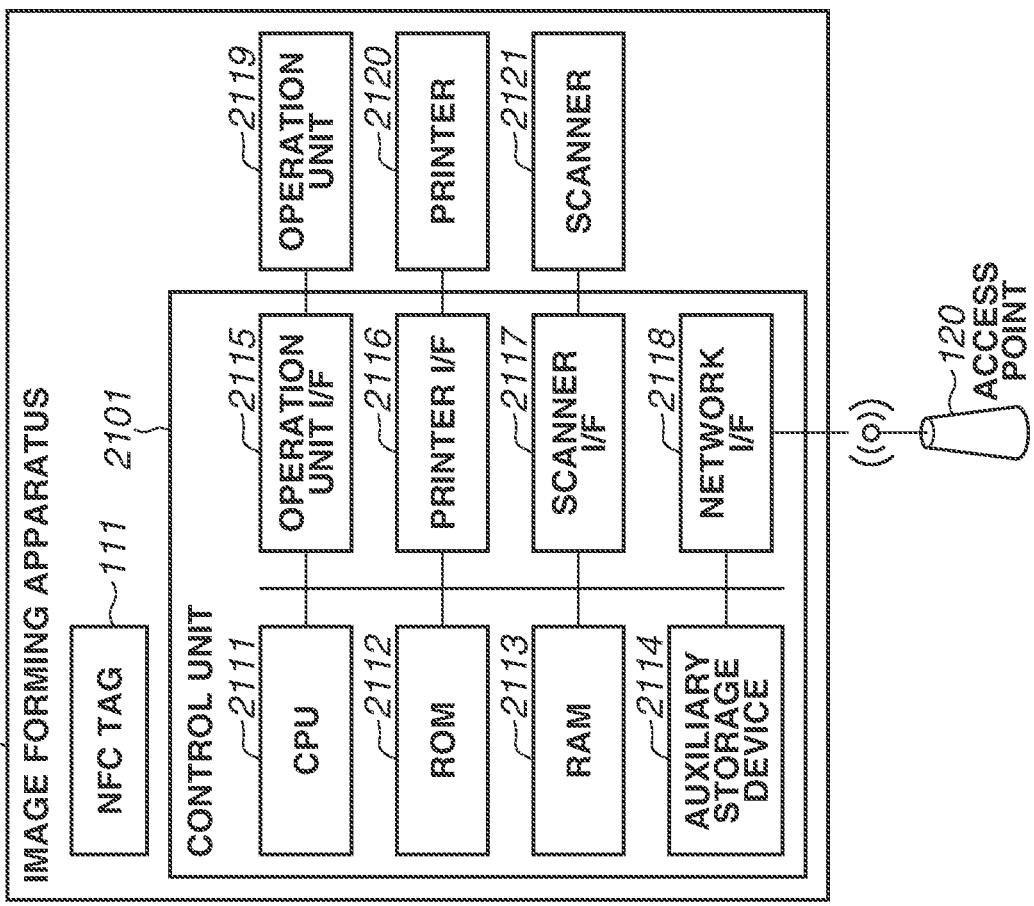
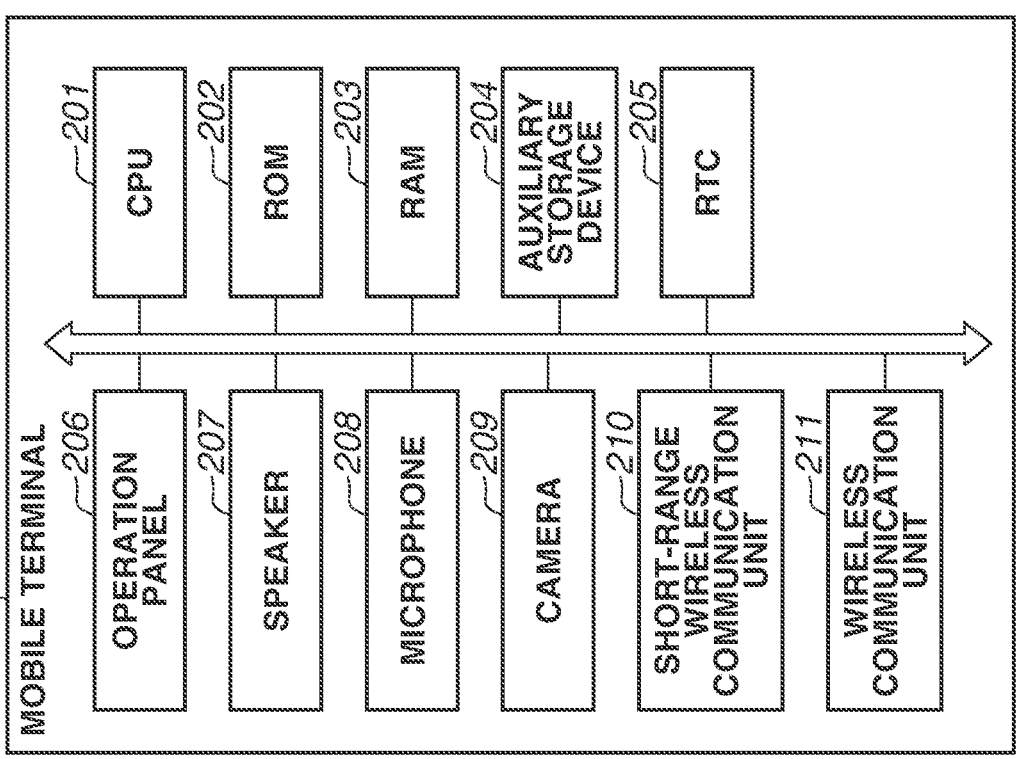

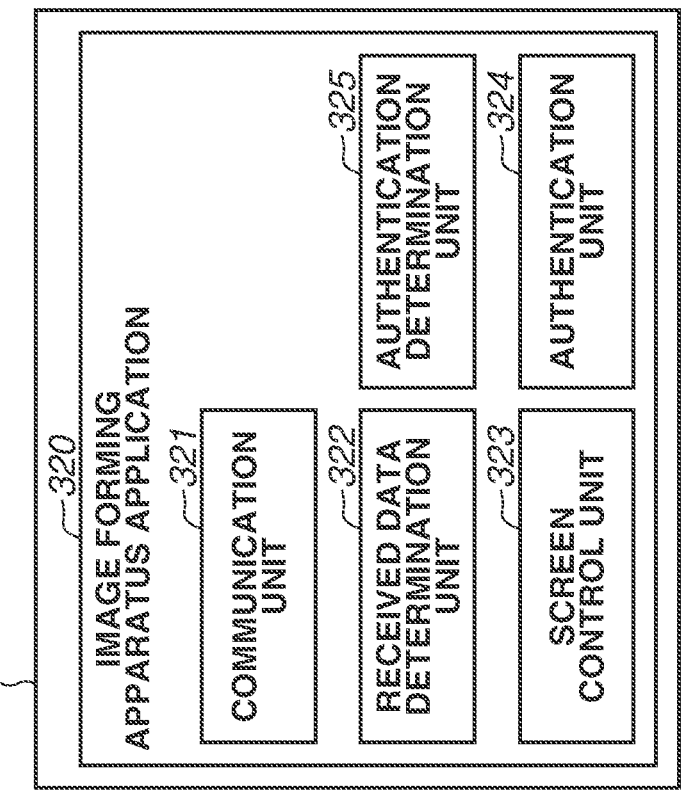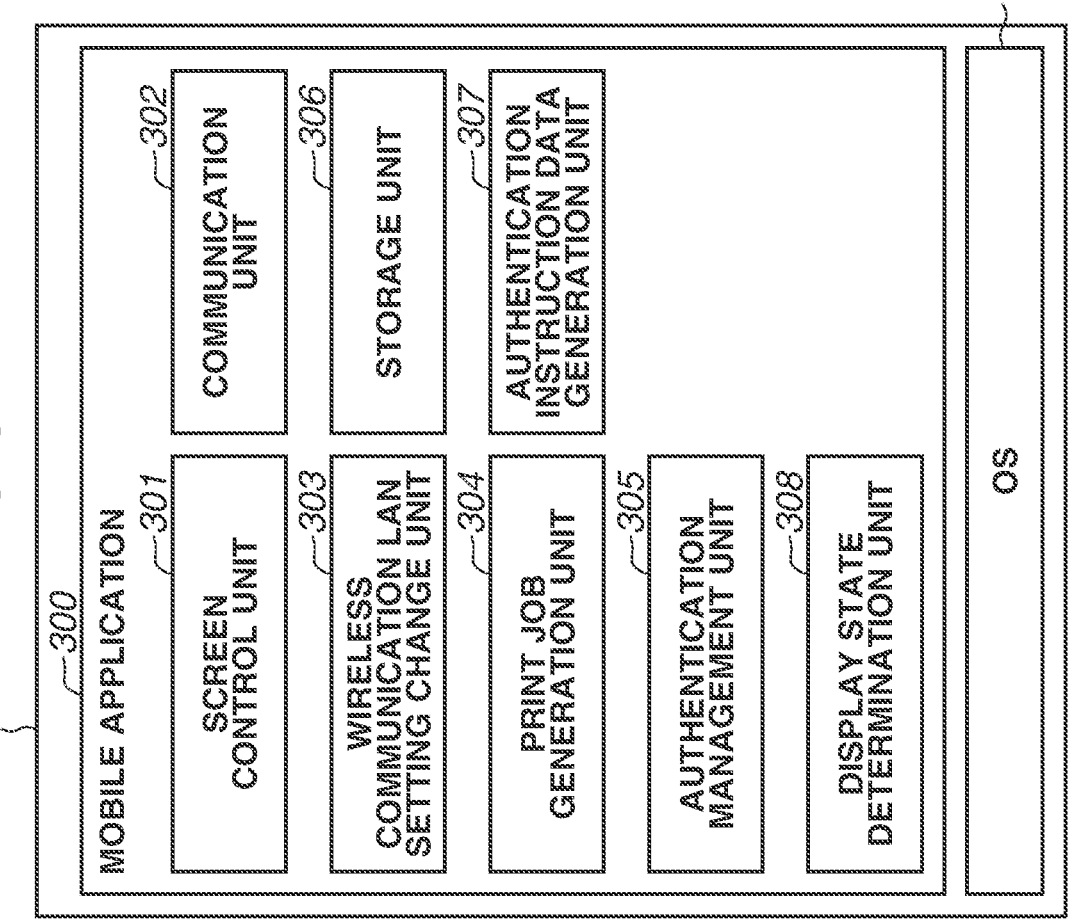

INFORMATION PROCESSING APPARATUS FOR IMPROVING TECHNIQUES FOR LOGGING INTO AN EXTERNAL DEVICE, CONTROL METHOD THEREFOR, AND STORAGE MEDIUM

BACKGROUND

Field

The present disclosure relates to an information processing apparatus, a control method therefor, and a storage medium.

Description of the Related Art

In an image forming apparatus including a near field communication (NFC) tag, information for identifying the image forming apparatus, such as connection information (an internet protocol (IP) address or a media access control (MAC) address) of the image forming apparatus, is stored in the NFC tag.

A mobile terminal reads the information from the NFC tag of the image forming apparatus to perform a wireless local area network (LAN) communication with the image forming apparatus. Then, on an application, the mobile terminal can transmit, to the image forming apparatus, authentication information to issue a login instruction, or issue an instruction to execute a print job for printing an image or a document.

For example, a handover discussed in Japanese Patent Application Laid-Open No. 2013-157736 is known in which a program is started on a mobile terminal and the mobile terminal is brought into contact with an NFC tag while an operation screen of the program is displayed, to read information from the NFC tag, so that an access point (AP) for connecting to a wireless communication LAN is switched.

As discussed in Japanese Patent No. 4504378, there is also known a technique in which, when a user operates an operation screen of a program and transmits authentication information to issue a login instruction to an image forming apparatus of a handover destination, the user can use a menu screen for selecting a function such as a copy function on an operation screen of the image forming apparatus.

However, in a case where the user uses the mobile terminal to log into the image forming apparatus, generally, the user needs to bring the mobile terminal close to the image forming apparatus or perform a predetermined operation in a state where a predetermined screen is displayed on a program for controlling the image forming apparatus. In other words, the user cannot transmit a login instruction to the image forming apparatus in a state where the program for controlling the image forming apparatus is operating in a background state—for example, in a state where the mobile terminal is locked. In this case, the user needs to unlock a lock screen to display the predetermined screen of the program first and then bring the mobile terminal close to the image forming apparatus. This can cause unnecessary inconvenience to the user.

SUMMARY

Various embodiments of the present disclosure provide techniques and mechanisms for easily logging into an image forming apparatus even when a program for controlling the image forming apparatus is operating in a background state.

According to an embodiment of the present disclosure, a method is provided for controlling an information processing apparatus configured to communicate with an external device and to execute an application. The method includes transmitting a login request for logging into the external device to the external device, based on a short-range wireless communication being established between the information processing apparatus and the external device in a state where the application is operating in a background state on the information processing apparatus.

Further features of the present disclosure will become apparent from the following description of exemplary embodiments with reference to the attached drawings.

BRIEF DESCRIPTION OF THE DRAWINGS

FIG. 2A is a block diagram illustrating a hardware configuration of a mobile terminal. FIG. 2B is a block diagram illustrating a hardware configuration of an image forming apparatus.

FIG. 3A is a block diagram illustrating a software configuration of the mobile terminal. FIG. 3B is a block diagram illustrating a software configuration of the image forming apparatus.

DESCRIPTION OF THE EMBODIMENTS

Exemplary embodiments of the present disclosure will be described below with reference to the drawings.

Figure 1:
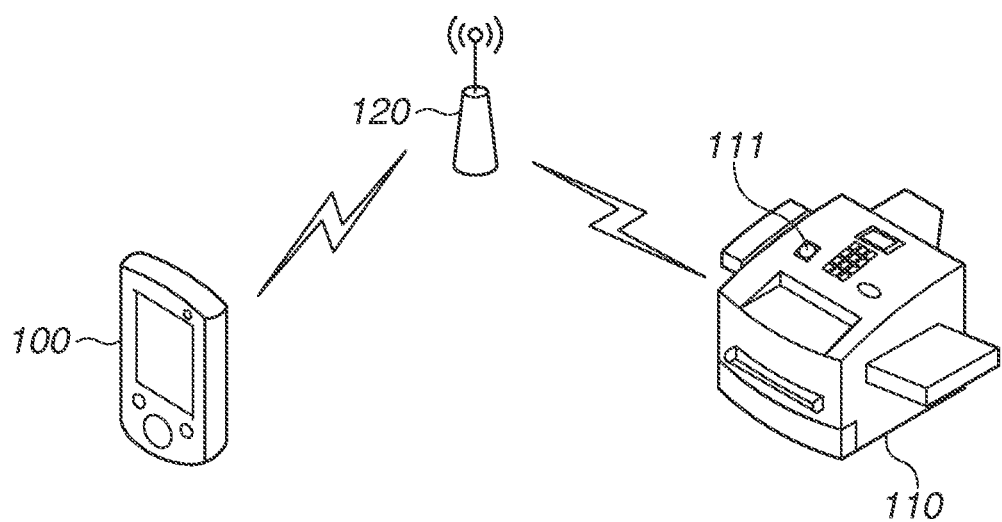
FIG. 1 is a diagram illustrating a configuration of an information processing system.

FIG. 1 illustrates a configuration of an information processing system. The information processing system includes a mobile terminal 100, an image forming apparatus 110, a near field communication (NFC) tag 111, and an access point 120.

FIG. 2A is a block diagram illustrating a hardware configuration of the mobile terminal 100. FIG. 2B is a block diagram illustrating a hardware configuration of the image forming apparatus 110. FIG. 3A is a block diagram illustrating a software configuration of the mobile terminal 100. FIG. 3B is a block diagram illustrating a software configuration of the image forming apparatus 110.

The mobile terminal 100 can perform a wireless communication via a wireless communication local area network (LAN) or the like. When an operator inputs information about the access point 120, such as a service set identifier (SSID) or a security key, to the mobile terminal 100, the mobile terminal 100 can connect to the access point 120 and communicate with the image forming apparatus 110 via the access point 120. The mobile terminal 100 can transmit authentication information to an external apparatus, such as the image forming apparatus 110, via the access point 120. The mobile terminal 100 can transmit a print job to an external apparatus, such as the image forming apparatus 110, via the access point 120. The mobile terminal 100 can perform a short-range wireless communication with the image forming apparatus 110.

The mobile terminal 100 can acquire information from the NFC tag 111 (described below) by short-range wireless communication and connect to the access point 120 based on the acquired information. The process of using the information acquired by short-range wireless communication to switch from a short-range wireless communication to another wireless communication such as a wireless LAN communication is referred to as a handover. The handover enables the operator to connect to the access point 120 without inputting information (such as the SSID or security key of the access point 120) for connecting to the access point 120.

The mobile terminal 100 includes a central processing unit (CPU) 201, a read-only memory (ROM) 202, a random access memory (RAM) 203, an auxiliary storage device 204, a real-time clock (RTC) 205, an operation panel 206, a speaker 207, a microphone 208, a camera 209, a short-range wireless communication unit 210, and a wireless communication unit 211. Furthermore, as described below, in the mobile terminal 100, an operating system (OS) 311 and a mobile application 300 are installed in the auxiliary storage device 204.

While in the present exemplary embodiment, the mobile terminal 100 is assumed to be an apparatus such as a smartphone or a tablet personal computer (PC), any other type of apparatus may also be used as long as the apparatus is an information processing apparatus configured to perform a wireless communication.

The CPU 201 reads out control programs stored in the ROM 202, and performs various kinds of processing for controlling the operation of the mobile terminal 100.

Figure 6:
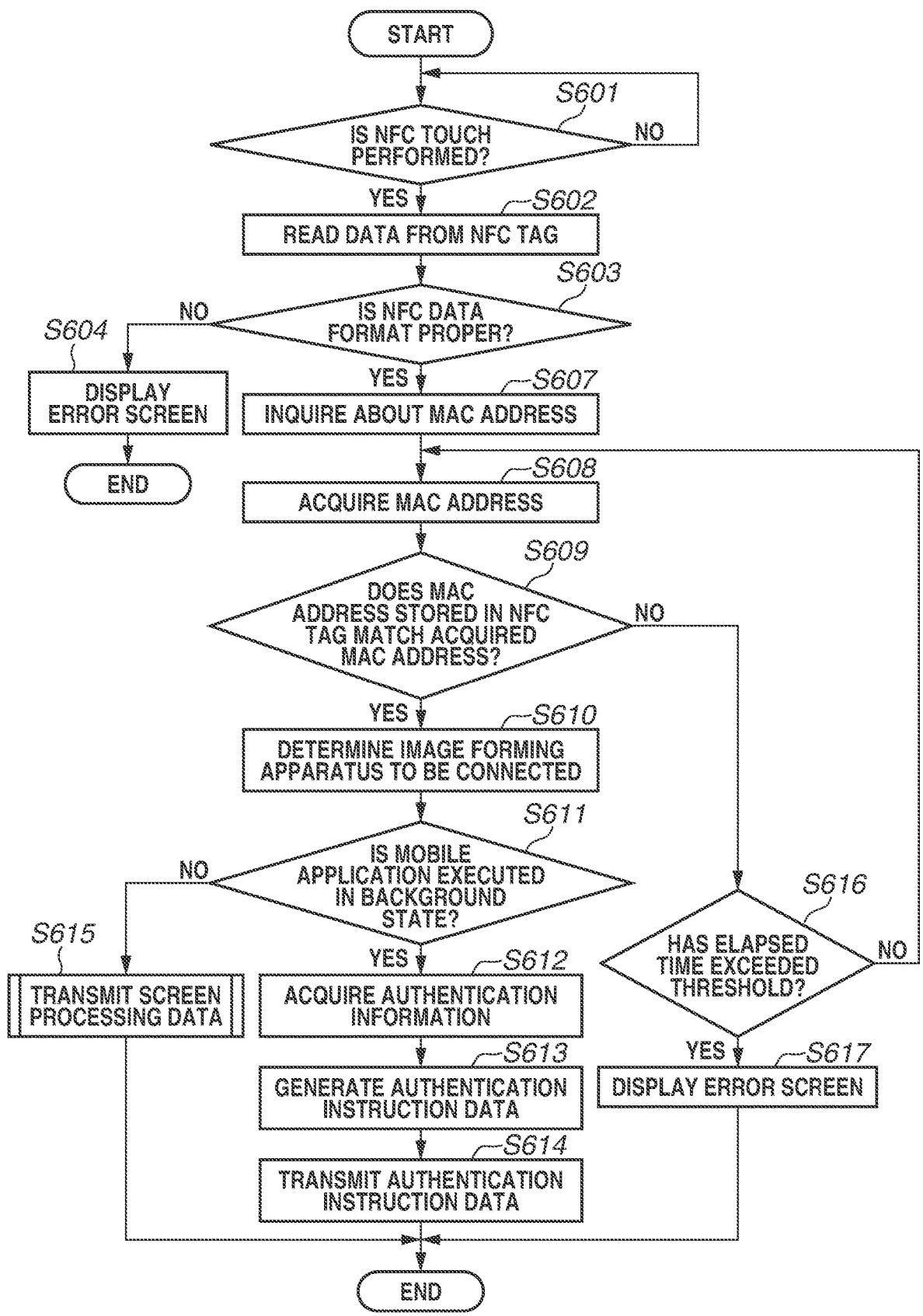
FIG. 6 is a flowchart illustrating processing performed while an application is being executed in a background state.
Figure 7:
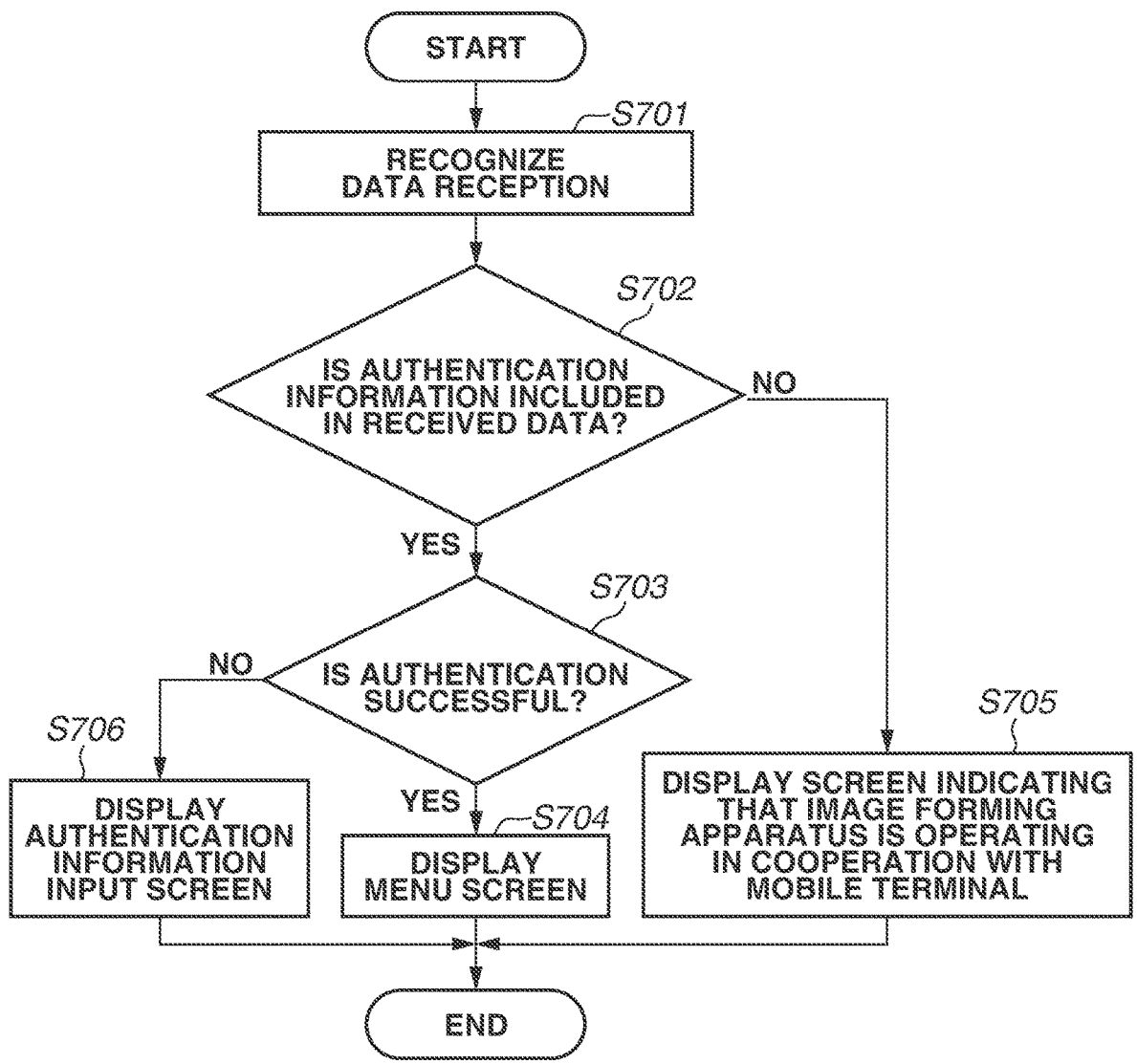
FIG. 7 is a flowchart illustrating screen display processing to be performed when data is received.

In the present exemplary embodiment, it is assumed that a single CPU 201 performs each processing in a flowchart illustrated in FIG. 6 and a single CPU 2111 performs each processing in a flowchart illustrated in FIG. 7. Alternatively, any other configuration may be used. For example, each processing in the flowcharts to be described below may be cooperatively performed by a plurality of CPUs.

The ROM 202 stores control programs for the mobile terminal 100. The control programs described herein refer to programs for control and operation of hardware of the mobile terminal 100. Examples of the programs include a Basic Input/Output System (BIOS) and firmware.

The RAM 203 is a memory to which data can be written optionally, and is used as a temporary storage area such as a main memory or a work area of the CPU 201. For example, when executing the control programs for the mobile terminal 100, the CPU 201 loads the control programs stored in the ROM 202 into the RAM 203 to execute the programs, thereby performing various kinds of processing.

The auxiliary storage device 204 stores various kinds of data, such as pictures captured by the camera 209, electronic documents, and programs. The OS 311 and the mobile application 300 are installed and stored as programs in the auxiliary storage device 204. In the present exemplary embodiment, a hard disk drive (HDD) is used as the auxiliary storage device 204. Alternatively, any other type of device, such as a solid state drive (SSD), may be used.

The RTC 205 measures the time and provides time information for the control programs stored in the ROM 202, the OS 311, the mobile application 300, and the like.

The operation panel 206 can detect a touch operation by the operator, and displays various kinds of screens provided by the OS 311 or the mobile application 300. The operator can perform a touch operation on the operation panel 206 to input a desired operation instruction to the mobile terminal 100.

In the present exemplary embodiment, the operator performs a touch operation on the operation panel 206 to input an operation instruction to the mobile terminal 100. Alternatively, for example, the operator may use hardware keys to input an operation instruction.

The speaker 207 and the microphone 208 are used when the mobile terminal 100 makes a call to another mobile terminal 100 or a fixed telephone. More specifically, when making a call to another mobile terminal 100 or a fixed telephone, the mobile terminal 100 inputs an operator's voice to the microphone 208 and outputs the other party's voice from the speaker 207 to transmit and exchange voice information. The speaker 207 and the microphone 208 may also be used for applications other than telephone calling. For example, the speaker 207 and the microphone 208 may also be used for voice output and voice input on an application.

The camera 209 captures an image in response to an image capturing instruction from the operator. Pictures captured by the camera 209 are stored as image data in a predetermined area of the auxiliary storage device 204.

The short-range wireless communication unit 210 performs communication processing for performing a short-range wireless communication via NFC or the like. In the present exemplary embodiment, when the mobile terminal 100 is brought close to the NFC tag 111, a short-range wireless communication is established between the short-range wireless communication unit 210 and the NFC tag 111. At this time, the short-range wireless communication unit 210 acquires information, such as the SSID or security key of the access point 120, from the NFC tag 111. The short-range wireless communication unit 210 can also perform a Bluetooth® communication.

The wireless communication unit 211 performs a wireless communication via a wireless LAN or the like. For example, by using a handover based on the information acquired from the NFC tag 111 by the short-range wireless communication unit 210, the wireless communication unit 211 can connect to the wireless LAN without a difficult operation on the access point 120.

More specifically, the use of connection information (the SSID or security key of the access point 120) acquired from the NFC tag 111 of the image forming apparatus 110 by the short-range wireless communication unit 210 enables the wireless communication unit 211 to connect to the access point 120.

The image forming apparatus 110 can perform a wireless communication via a wireless communication LAN or the like with the mobile terminal 100 via the access point 120 and connect to the network. The image forming apparatus 110 performs authentication using the authentication information received from the mobile terminal 100, and provides menu options (e.g., a copy function) available in the mobile terminal 100. Furthermore, the image forming apparatus 110 executes the print job or the like received from the mobile terminal 100.

The image forming apparatus 110 includes the NFC tag 111, a control unit 2101, an operation unit 2119, a printer 2120, and a scanner 2121. The image forming apparatus 110 may also include a communication unit for performing a Bluetooth® communication.

Figure 4:
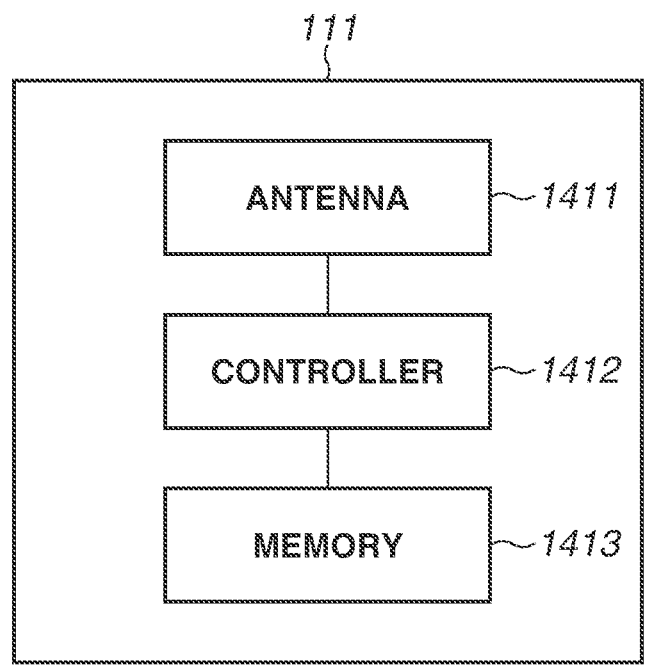
FIG. 4 is a block diagram illustrating a hardware configuration of a near field communication (NFC) tag.

FIG. 4 is a block diagram illustrating a hardware configuration of the NFC tag 111.

The NFC tag 111 stores information, such as the SSID or security key of the access point 120, for connecting to the access point 120. When the short-range wireless communication unit 210 is brought close to the NFC tag 111, a short-range wireless communication is established between the short-range wireless communication unit 210 and the NFC tag 111, so that the short-range wireless communication unit 210 acquires the information from the NFC tag 111. Although the NFC tag 111 is incorporated into the image forming apparatus 110, the NFC tag 111 is not electrically connected to the control unit 2101 and cannot communicate with the control unit 2101.

In the present exemplary embodiment, the NFC tag 111 uses an NFC method to communicate with the short-range wireless communication unit 210. Alternatively, any communication method other than the NFC method may be used as long as the method enables short-range wireless communication, and the NFC tag 111 may have a shape suitable for the short-range wireless communication. For example, a communication may be established between the NFC tag 111 and the short-range wireless communication unit 210 by using a Bluetooth® pairing connection method. In this case, an integrated circuit (IC) card into which a separate power supply, such as a button battery, is incorporated may be used.

In the present exemplary embodiment, the NFC tag 111 is included in the image forming apparatus 110, but may not be necessarily included therein. For example, the NFC tag 111 may be present outside the image forming apparatus 110.

The NFC tag 111 includes an antenna 1411, a controller 1412, and a memory 1413.

The antenna 1411 operates as an antenna for wireless communication from the short-range wireless communication unit 210. The antenna 1411 is connected to the controller 1412, and power supplied from the short-range wireless communication unit 210 by electromagnetic induction enables the controller 1412 to operate.

The controller 1412 communicates with the mobile terminal 100 via the antenna 1411, and issues a processing instruction to the memory 1413 by communication. The memory 1413 stores information about the image forming apparatus 110. The controller 1412 can notify the mobile terminal 100 of the information via the antenna 1411.

The memory 1413 holds the information about the image forming apparatus 110, such as a media access control (MAC) address of the image forming apparatus 110. The controller 1412 notifies the mobile terminal 100 of the information held in the memory 1413.

The control unit 2101 controls the operation of the image forming apparatus 110. The control unit 2101 is connected to each of the operation unit 2119, the printer 2120, and the scanner 2121. The control unit 2101 includes the CPU 2111, a ROM 2112, a RAM 2113, an auxiliary storage device 2114, an operation unit interface (I/F) 2115, a printer I/F 2116, a scanner I/F 2117, and a network I/F 2118.

The CPU 2111 reads out control programs stored in the ROM 2112 and performs various kinds of control processing, such as scan control and transmission control, in the image forming apparatus 110.

The ROM 2112 stores the control programs for the image forming apparatus 110. The control programs described herein refer to programs for control and operation of hardware of the image forming apparatus 110. Examples of the programs include a BIOS and firmware.

The RAM 2113 is a memory to which data can be written optionally, and is used as a temporary storage area such as a main memory or a work area of the CPU 2111. For example, when executing the control programs for the image forming apparatus 110, the CPU 2111 loads the control programs stored in the ROM 2112 into the RAM 2113 to execute the programs, thereby performing various kinds of processing.

The auxiliary storage device 2114 stores various kinds of data such as image data, electronic documents, and programs. The auxiliary storage device 2114 also stores an image forming apparatus application 320. In the present exemplary embodiment, an HDD is used as the auxiliary storage device 2114. Alternatively, any other type of device, such as an SSD, may be used.

The operation unit I/F 2115 functions as an interface for connecting the control unit 2101 and the operation unit 2119 to each other. The operation unit I/F 2115 relays communication between the control unit 2101 and the operation unit 2119.

The printer I/F 2116 functions as an interface for connecting the control unit 2101 and the printer 2120 to each other. The printer I/F 2116 is connected to the printer 2120 and relays communication between the control unit 2101 and the printer 2120. As a print job to be executed by the printer 2120, image data is transferred from the control unit 2101 to the printer 2120 via the printer I/F 2116. Then, the printer 2120 prints an image on a recording medium based on the image data.

The scanner I/F 2117 functions as an interface for connecting the control unit 2101 and the scanner 2121 to each other. The scanner I/F 2117 is connected to the scanner 2121 and relays communication between the control unit 2101 and the scanner 2121. The scanner 2121 scans an image on a document to generate image data, and outputs the generated image data to the control unit 2101 via the scanner I/F 2117.

The network I/F 2118 functions as an interface for connecting the control unit 2101 and the access point 120 to each other. The network I/F 2118 has a wireless communication function for connecting to the access point 120. In the present exemplary embodiment, the access point 120 and the network I/F 2118 are connected via a wireless LAN. Alternatively, wired communication may be performed using a LAN cable or the like.

The network I/F 2118 inputs authentication information or a print job, which has been received from the mobile terminal 100, to the control unit 2101 via the access point 120.

The operation unit 2119 is a user interface for allowing the user to operate the image forming apparatus 110. The operation unit 2119 is connected to the operation unit I/F 2115 and communicates with the control unit 2101 via the operation unit I/F 2115. The operation unit 2119 includes a liquid crystal display section that displays the state of the image forming apparatus 110 so that the user can recognize the state of the image forming apparatus 110, and a keyboard for transmitting information about a user's operation to the image forming apparatus 110. The liquid crystal display section may have a touch panel function and may be integrally formed with the keyboard.

The printer 2120 prints an image on a recording medium based on the image data transferred from the control unit 2101. The printer 2120 is connected to the printer I/F 2116 and communicates with the control unit 2101 to receive print image data as a print job via the printer I/F 2116.

The scanner 2121 converts an image on a document into image data. The scanner 2121 is connected to the scanner I/F 2117 and outputs the image data, which is obtained by the scanner 2121 scanning and converting the image on the document, to the control unit 2101 via the scanner I/F 2117.

Various kinds of applications can be installed in the mobile terminal 100, and software for controlling the installed applications is used. While in the present exemplary embodiment, the OS 311 and the mobile application 300 are installed in the mobile terminal 100, applications other than the OS 311 and the mobile application 300 may also be installed in the mobile terminal 100.

Applications that support the applications installed in the mobile terminal 100 and are used to control the image forming apparatus 110 can be installed in the image forming apparatus 110. While in the present exemplary embodiment, the image forming apparatus application 320 is installed in the image forming apparatus 110, applications other than the image forming apparatus application 320 may also be installed in the image forming apparatus 110.

The OS 311 is software for controlling the entire operation of the mobile terminal 100. The OS 311 operates as a program in the mobile terminal 100. Processing for delivering information between the hardware of the mobile terminal 100 and the application installed in the mobile terminal 100, for example, the mobile application 300 is described in the OS 311. The CPU 201 performs the processing based on the processing described in the OS 311.

The mobile application 300 is installed in the mobile terminal 100 and is stored as a program in the auxiliary storage device 204. The mobile application 300 runs on the mobile terminal 100. The CPU 201 can transmit authentication information to issue a login instruction to the image forming apparatus 110, or issue a print instruction or a scan instruction to the image forming apparatus 110, based on processing described in the mobile application 300.

The mobile application 300 includes a screen control unit 301, a communication unit 302, a wireless communication LAN setting change unit 303, a print job generation unit 304, an authentication management unit 305, a storage unit 306, an authentication instruction data generation unit 307, and a display state determination unit 308.

Figure 5:
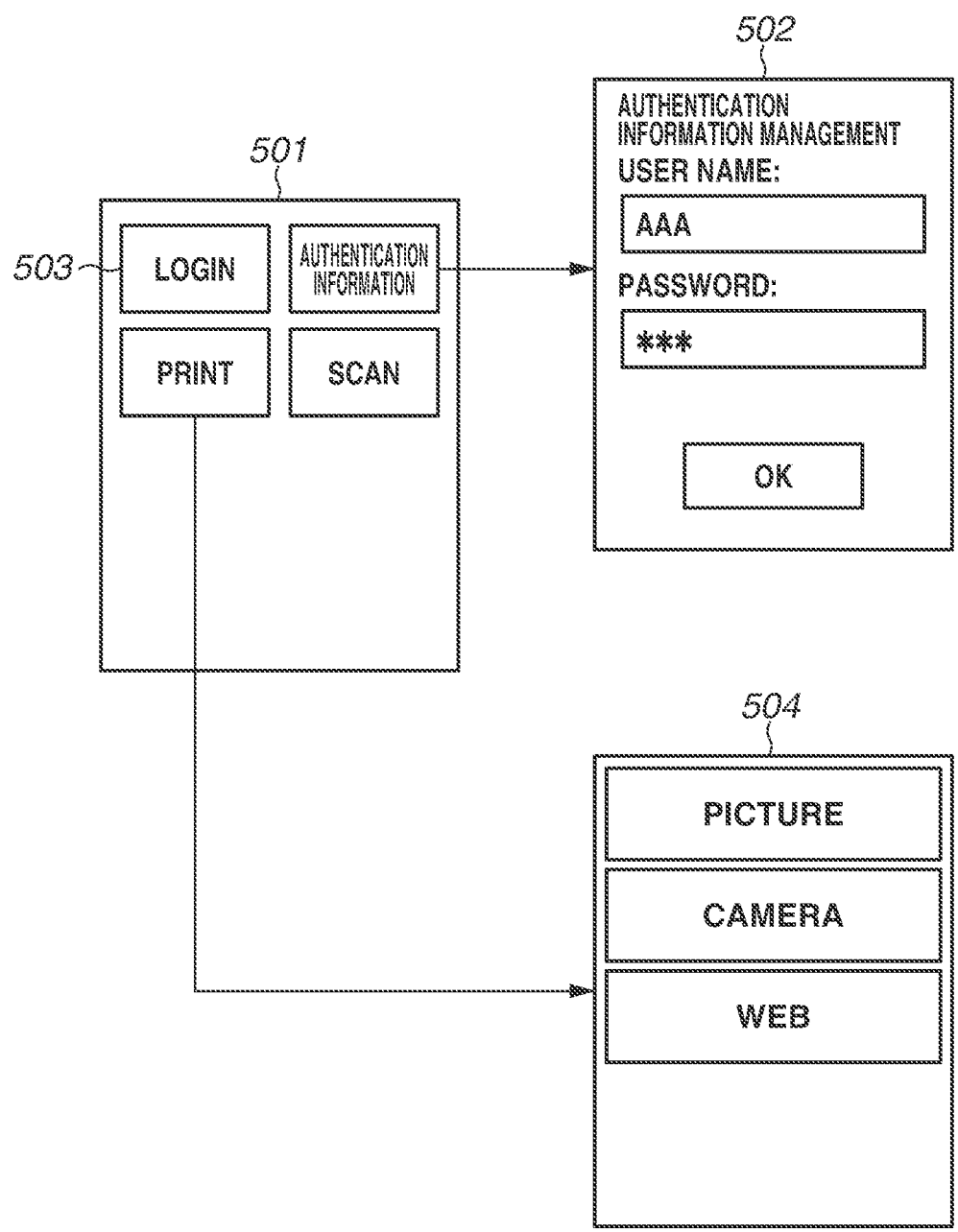
FIG. 5 is a diagram illustrating a screen transition of the mobile terminal.

Processing performed by the CPU 201 to control display of a screen on the operation panel 206 is described in the screen control unit 301. Processing for displaying screens as illustrated in FIG. 5 (described below) on the operation panel 206 is described in the screen control unit 301. The CPU 201 identifies the operation instruction input by the operator through the operation panel 206, based on the processing described in the screen control unit 301.

Processing for performing a communication by short-range wireless communication using the short-range wireless communication unit 210 via the OS 311 and processing for controlling the wireless communication by the wireless communication unit 211 are described in the communication unit 302.

Processing for changing a wireless communication setting on the mobile terminal 100 is described in the wireless communication LAN setting change unit 303. The CPU 201 processes information about the wireless communication setting to be changed, based on the processing described in the wireless communication LAN setting change unit 303. Using the processed information about the wireless communication setting as a parameter, the CPU 201 performs the processing described in the OS 311, and changes a setting for wireless communication hardware, for example, the wireless communication unit 211.

Print job generation processing is described in the print job generation unit 304. The CPU 201 generates a print job based on the processing described in the print job generation unit 304, and transmits the print job from the wireless communication unit 211 to the image forming apparatus 110 via the access point 120 through the network.

Figure 10A:
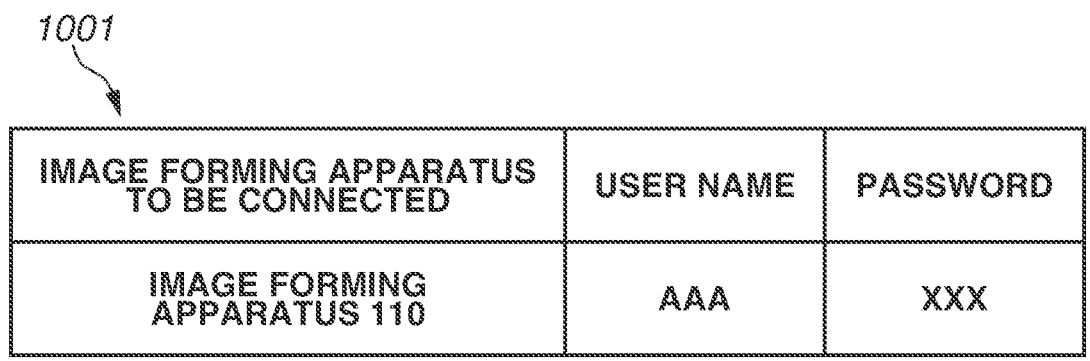
FIGS. 10A and 10B each illustrate an example of an authentication information management table.

FIG. 10A illustrates an example of an authentication information management table based on processing described in the authentication management unit 305.

Processing for managing the authentication information for the image forming apparatus 110 to which the mobile terminal 100 issues a login instruction, and providing the managed authentication information is described in the authentication management unit 305. A management table 1001 is used to hold in the RAM 203 or the auxiliary storage device 204 authentication information input by the user, based on the processing described in the authentication management unit 305. The authentication information is a combination of information indicating an image forming apparatus of a connection destination (i.e., the image forming apparatus 110 in the present exemplary embodiment) to which the authentication information is to be transmitted, a user name, and a password, and is stored as one record in the management table 1001.

Processing for temporarily storing various kinds of information in the RAM 203 is described in the storage unit 306. Examples of various kinds of information described herein include work data generated by an application operation, such as a work file generated before print job generation based on the processing described in the print job generation unit 304.

Processing for generating authentication instruction data based on the authentication information is described in the authentication instruction data generation unit 307. The CPU 201 extracts the authentication information held in the management table 1001 from the RAM 203 or the auxiliary storage device 204, and generates authentication instruction data using the authentication information as an input value, based on the processing described in the authentication instruction data generation unit 307. The CPU 201 transmits the authentication instruction data from the wireless communication unit 211 to the image forming apparatus 110. The image forming apparatus 110 performs authentication using the received authentication instruction data.

Figure 8:
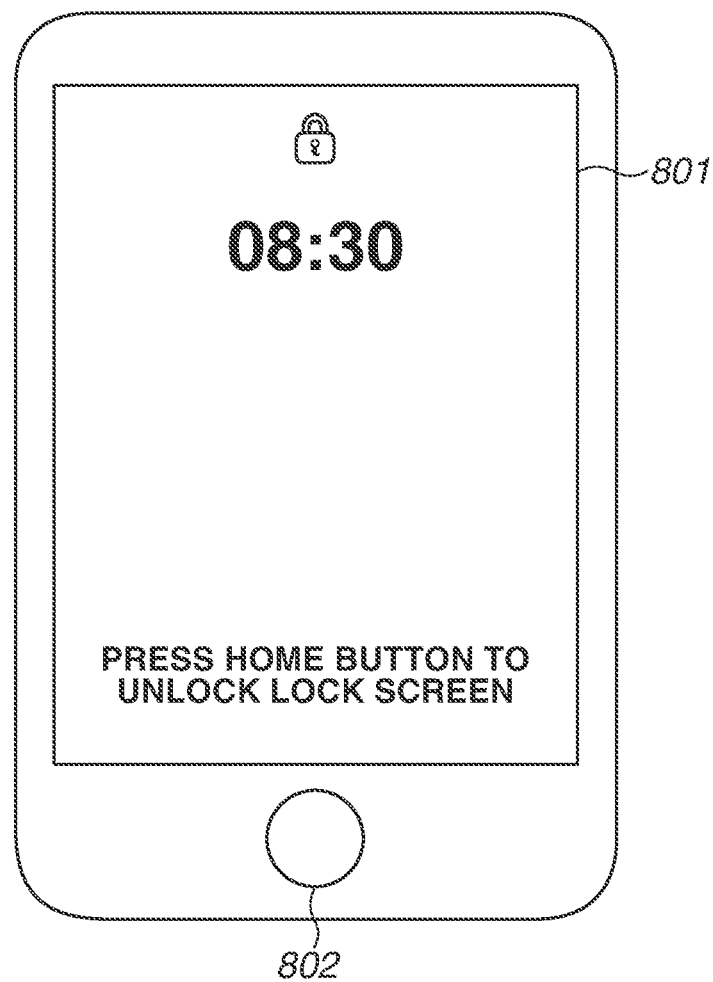
FIG. 8 is a diagram illustrating an example of a lock screen of the mobile terminal.

FIG. 8 illustrates an example of a lock screen 801 of the mobile terminal 100.

Processing for determining whether the program being executed is in a background state is described in the display state determination unit 308. The CPU 201 determines whether the mobile application 300 is being executed in the background state, i.e., whether the mobile application 300 is not being executed in a foreground state.

More specifically, for example, in a case where the lock screen 801 is displayed on the mobile terminal 100, the CPU 201 determines that the mobile application 300 is in the background state. The lock screen 801 is a screen on which an input operation on the operation panel 206 is restricted as illustrated in FIG. 8. Information that is not directly related to the operation, such as information about the time and a method for unlocking the lock screen 801, is displayed on the lock screen 801. The lock screen 801 can be unlocked by, for example, a press of a home button 802 that is displayed at a lower portion of the lock screen 801. Alternatively, the lock screen 801 may be unlocked by another operation such as a swipe or a flick.

The image forming apparatus application 320 is installed in the image forming apparatus 110, and is stored as a program in the auxiliary storage device 2114. The image forming apparatus application 320 is a program that runs on the image forming apparatus 110. The CPU 2111 can control reception of the authentication information transmitted from the mobile terminal 100, login processing, printing, scanning, or the like, based on processing described in the image forming apparatus application 320.

The image forming apparatus application 320 includes a communication unit 321, a received data determination unit 322, a screen control unit 323, an authentication unit 324, and an authentication determination unit 325.

Processing performed by the CPU 2111 to receive the authentication instruction data transmitted from the mobile terminal 100 is described in the communication unit 321. In this processing, the CPU 2111 receives the authentication instruction data from the mobile terminal 100 via the network I/F 2118 by wireless communication. Processing for receiving data such as a print job in addition to the authentication instruction data may be described in the communication unit 321.

Processing performed by the CPU 2111 to determine whether data received by the communication unit 321 includes authentication information is described in the received data determination unit 322.

Processing performed by the CPU 2111 to control the display of a screen on the image forming apparatus 110 is described in the screen control unit 323. In this processing, the CPU 2111 controls the display of a screen on the liquid crystal display section of the operation unit 2119 via the operation unit I/F 2115.

Figure 10B:
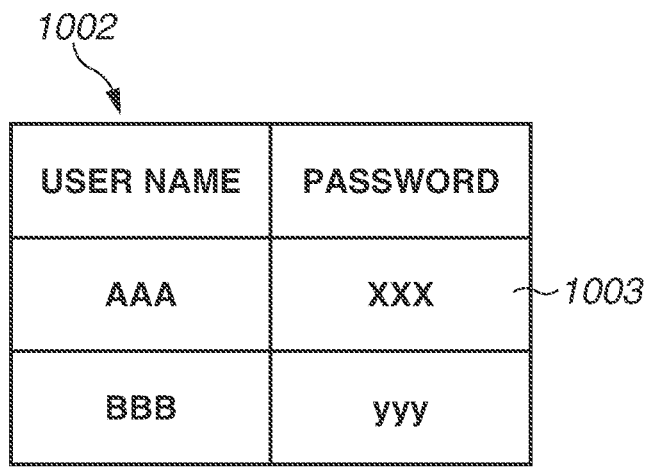

FIG. 10B illustrates an example of an authentication information management table held in the RAM 2113 based on the processing described in the authentication unit 324.

Processing for authentication information management by the RAM 2113 and for authentication result determination is described in the authentication unit 324. A management table 1002 is an example of the authentication information management table held in the RAM 2113. The authentication unit 324 manages an account 1003 including a plurality of combinations of a user name and a password.

Processing for determining the authentication instruction data received from the mobile terminal 100 is described in the authentication determination unit 325. The CPU 2111 searches the management table 1002 for authentication information indicating the combination of the user name and the password included in the authentication instruction data, and determines whether the authentication information in the received authentication instruction data is matched. In other words, the CPU 2111 determines the authentication result of the authentication information.

The access point 120 relays communication between the mobile terminal 100 and the image forming apparatus 110.

More specifically, the access point 120 forms a wireless LAN with the access point 120 as the center, and connects each of the mobile terminal 100 and the image forming apparatus 110 to the wireless LAN.

FIG. 5 illustrates an example of a screen transition of the mobile terminal 100.

An outline of each of an authentication instruction function and a printing function that are implemented by the mobile application 300 and a screen transition will be described next. Each screen illustrated in FIG. 5 is to be displayed on the operation panel 206 by the screen control unit 301 of the mobile application 300.

A home screen 501 is to be displayed first when the mobile application 300 is started.

The home screen 501 includes a plurality of buttons. When any one of the buttons is pressed, the home screen 501 transitions to a screen for using a function associated with the pressed button. For example, in the present exemplary embodiment, the home screen 501 includes a login button 503, an authentication information button, a print button, and a scan button. The home screen 501 may also include any other button.

An authentication information management screen 502 is to be displayed when the operator touches the authentication information button on the home screen 501. The authentication information management screen 502 is used to input a user name and a password for the image forming apparatus 110 of the handover destination. When an OK button is pressed (touched) on the authentication information management screen 502, the CPU 201 stores the input user name and password in the management table 1001 in the RAM 203 or the auxiliary storage device 204 based on the processing described in the authentication management unit 305.

The login button 503 is used to transmit the authentication information to issue a login instruction. More specifically, when the login button 503 is pressed (touched), the authentication information stored managed by the authentication management unit 305 is transmitted to issue a login instruction to the image forming apparatus 110 of the handover destination.

A print screen 504 is to be displayed when the print button is pressed (touched) on the home screen 501. The print screen 504 is used to instruct the image forming apparatus 110 of the handover destination to execute a print job.

A scan setting screen is also to be displayed when the scan button is selected on the home screen 501, so that a scan setting instruction, a scan execution instruction, a data preview instruction, or the like can be issued to the image forming apparatus 110 of the handover destination. An instruction can also be issued to the image forming apparatus 110 when an NFC touch is performed on the image forming apparatus 110 in a state where a predetermined screen is displayed on the mobile application 300. For example, when the NFC touch is performed in a state where a print setting screen is displayed on the mobile application 300, a print job including the contents set on the print setting screen is transmitted to the image forming apparatus 110. The NFC touch described herein refers to an operation of bringing the mobile terminal 100 close to the NFC tag 111. When the NFC touch is performed, the mobile terminal 100 performs a short-range wireless communication to read the information stored in the NFC tag 111, and performs a wireless LAN communication with the image forming apparatus 110.

Conventionally, in a state where the mobile application 300 is being executed in a background (e.g., a state where the lock screen 801 is displayed) on the mobile terminal 100, the operator cannot transmit an instruction to the image forming apparatus 110 even when performing the NFC touch. Thus, for example, if the operator wishes to use the mobile terminal 100 to log into the image forming apparatus 110, the operator is to unlock the lock screen 801 to display the home screen 501 by pressing the home button 802 first, and then select the login button 503 or display a predetermined screen to perform the NFC touch. This is troublesome for the operator.

To address this, in the present exemplary embodiment, in a case where the mobile terminal 100 is brought close to the NFC tag 111 of the image forming apparatus 110 and the short-range wireless communication unit 210 acquires connection information from the NFC tag 111 while the mobile application 300 is being executed in the background state, the mobile terminal 100 transmits the authentication information to issue a login instruction to the image forming apparatus 110. This configuration enables the operator that performs the NFC touch on the lock screen 801 to smoothly transition to the operation screen of the image forming apparatus 110, for example, the menu screen for selecting a function such as the copy function. If the NFC touch is performed while the mobile application 300 is not being executed in the background state, i.e., while the mobile application 300 is being executed in the foreground state, an operation similar to a conventional operation is carried out. For example, if the NFC touch is performed in a state where the print setting screen is displayed on the mobile application 300, a print job is transmitted to the image forming apparatus 110. As described above, in a case where the user performs the NFC touch in a state where a predetermined screen is displayed on the mobile application 300, the user can transmit, to the image forming apparatus 110, an instruction depending on the screen being displayed. Furthermore, in a case where the user performs the NFC touch while the mobile application 300 is in the background state, the user can log into the image forming apparatus 110. In other words, the mobile terminal 100 can be used as an identification (ID) card for logging into the image forming apparatus 110.

FIG. 6 is a flowchart illustrating processing performed while the mobile application 300 is being executed in the background state.

Processing performed while the mobile application 300 is being executed in the background state, i.e., while the mobile terminal 100 is locked will be described with reference to the flowchart illustrated in FIG. 6.

The flowchart illustrated in FIG. 6 is performed by the CPU 201 reading out the mobile application 300 from the RAM 203 or the auxiliary storage device 204 and executing the mobile application 300. It is assumed that the user uses the mobile application 300 to issue a login instruction to the image forming apparatus 110 from the mobile terminal 100 at least once, and the management table 1001 is stored in the RAM 203 or the auxiliary storage device 204.

In step S601, the CPU 201 determines whether the NFC touch is performed to bring the mobile terminal 100 close to the NFC tag 111. If the CPU 201 determines that the NFC touch is performed (YES in step S601), the processing proceeds to step S602. If the CPU 201 determines that the NFC touch is not performed (NO in step S601), the processing of step S601 is repeated.

In step S602, the CPU 201 reads the data stored in the NFC tag 111 via the short-range wireless communication unit 210. Then, the CPU 201 attempts to connect to the network by using information acquired by reading the data, thereby performing acquisition processing and attempt processing.

Examples of the stored data include information for connecting to the access point 120, such as an internet protocol (IP) address of the image forming apparatus 110, and the SSID or security key of the access point 120.

In step S603, the CPU 201 performs a data format determination for determining whether the format of the data read in step S602 is proper. If the format is proper (YES in step S603), the processing proceeds to step S607. If the format is improper (NO in step S603), for example, if written data is improper or data is unsuccessfully read, the processing proceeds to step S604.

In step S604, the CPU 201 displays an error screen on the operation panel 206 to notify the operator of the occurrence of an error, and then terminates the processing of the mobile application 300.

In step S607, the CPU 201 inquires about the MAC address of the image forming apparatus 110 by using an address resolution protocol (ARP). More specifically, the CPU 201 uses the wireless communication unit 211 to transmit a broadcast packet to the wireless LAN network. This enables the CPU 201 to identify the MAC address associated with the IP address of the image forming apparatus 110 stored in the NFC tag 111, thereby establishing a communication.

In step S608, the CPU 201 uses the wireless communication unit 211 to receive a response packet from the image forming apparatus 110, and stores the MAC address of the image forming apparatus 110 in the OS 311. If the OS 311 has already held information about the MAC address of the image forming apparatus 110, more specifically, if information about the MAC address of the image forming apparatus 110 is stored in an ARP table of the OS 311, the CPU 201 may search the ARP table to acquire the MAC address.

In step S609, the CPU 201 compares the MAC address stored in the NFC tag 111 read in step S602 with the MAC address acquired in step S608. If the MAC addresses match (YES in step S609), the processing proceeds to step S610. If the MAC addresses do not match (NO in step S609), the processing proceeds to step S616.

In step S610, the CPU 201 determines the image forming apparatus 110 having the MAC address acquired in step S608 as the apparatus including the NFC tag 111, and sets the image forming apparatus 110 as a communication target. Next, the CPU 201 sets the IP address corresponding to the MAC address as the IP address of the image forming apparatus 110 including the NFC tag 111. This is because the NFC tag 111 cannot communicate with the control unit 2101 and even when the NFC tag 111 is physically connected to the image forming apparatus 110, the CPU 201 cannot recognize the presence of the NFC tag 111. For this reason, the CPU 201 recognizes the presence of the NFC tag 111 by comparing the MAC address stored in the NFC tag 111, which is assigned to the apparatus connected to the NFC tag 111, with the MAC address of the image forming apparatus 110.

In step S611, the CPU 201 performs a background state determination for determining whether the mobile application 300 is being executed in the background state, based on the processing described in the display state determination unit 308. If the mobile application 300 is being executed in the background state (YES in step S611), the processing proceeds to step S612 to transmit the authentication instruction data. If the mobile application 300 is being executed in the foreground state (NO in step S611), the processing proceeds to step S615. The CPU 201 may determine whether the mobile terminal 100 is locked, instead of determining whether the mobile application 300 is being executed in the background state.

In step S612, the CPU 201 performs authentication information acquisition processing for acquiring authentication information, based on the processing described in the authentication management unit 305. The CPU 201 acquires, as the authentication information, the user name and the password that correspond to the image forming apparatus 110 and are stored in the management table 1001, from the RAM 203.

In step S613, the CPU 201 generates the authentication instruction data from the authentication information acquired in step S612, based on the processing described in the authentication instruction data generation unit 307.

In step S614, the CPU 201 transmits the authentication instruction data for issuing an authentication instruction to the image forming apparatus 110 determined in step S610. More specifically, the CPU 201 transmits the authentication instruction data generated in step S613 to the IP address of the image forming apparatus 110 determined in step S610 via the communication unit 302 through the wireless LAN network.

In step S615, the CPU 201 transmits an instruction to the image forming apparatus 110 depending on the screen being displayed on the mobile application 300. For example, in a case where the print setting screen is displayed on the mobile application 300, the mobile terminal 100 transmits a print job to the image forming apparatus 110.

In step S616, the CPU 201 determines whether an elapsed time from the execution of step S607 has exceeded a threshold. If the elapsed time has exceeded the threshold, for example, if 10 seconds or more has passed (YES in step S616), the processing proceeds to step S617. If the elapsed time has not exceeded the threshold (NO in step S616), the processing returns to step S608.

In step S617, the CPU 201 displays an error screen on the operation panel 206, which indicates a failure to find the image forming apparatus 110 based on the information of the NFC tag 111, to notify the operator of the failure, and then terminates the processing.

FIG. 7 is a flowchart illustrating screen display processing to be performed when data is received on the image forming apparatus application 320.

More specifically, the processing in which the image forming apparatus application 320 recognizes that data transmitted from the mobile terminal 100 via the network I/F 2118 is received, and provides a screen to be displayed on the image forming apparatus 110 will be described with reference to the flowchart illustrated in FIG. 7. Each step in the flowchart illustrated in FIG. 7 is performed by the CPU 2111 reading out the image forming apparatus application 320 from the RAM 203 or the auxiliary storage device 204 and executing the image forming apparatus application 320.

It is assumed that the image forming apparatus 110 stores in the RAM 2113 the account 1003 including a plurality of combinations of a user name and a password, as the management table 1002.

In step S701, the CPU 2111 recognizes that data is received via the network OF 2118. More specifically, the CPU 2111 recognizes that the authentication instruction data is received via the network I/F 2118.

In step S702, the CPU 2111 determines whether authentication information is included in the received data, based on the processing described in the received data determination unit 322.

The data transmitted from the mobile terminal 100 is either the authentication instruction data transmitted in step S614 or screen processing data transmitted in step S615. Accordingly, if authentication information is included in the received data (YES in step S702), the processing proceeds to step S703. If authentication information is not included in the received data (NO in step S702), i.e., if the received data is the screen processing data, the processing proceeds to step S705.

In step S703, the CPU 2111 performs an authentication result determination for determining whether the authentication is successful, using the authentication information included in the authentication instruction data based on the processing described in the authentication determination unit 325. If the authentication is successful (YES in step S703), the processing proceeds to step S704. If the authentication is unsuccessful (NO in step S703), the processing proceeds to step S706. More specifically, the CPU 2111 searches for the combination of the user name and the password in the authentication information through the management table 1002 stored in the RAM 2113. If data that matches the authentication information is present in the account 1003, the CPU 2111 determines that the authentication is successful. If no data matches the authentication information, the CPU 2111 determines that the authentication is unsuccessful.

Figure 9A:
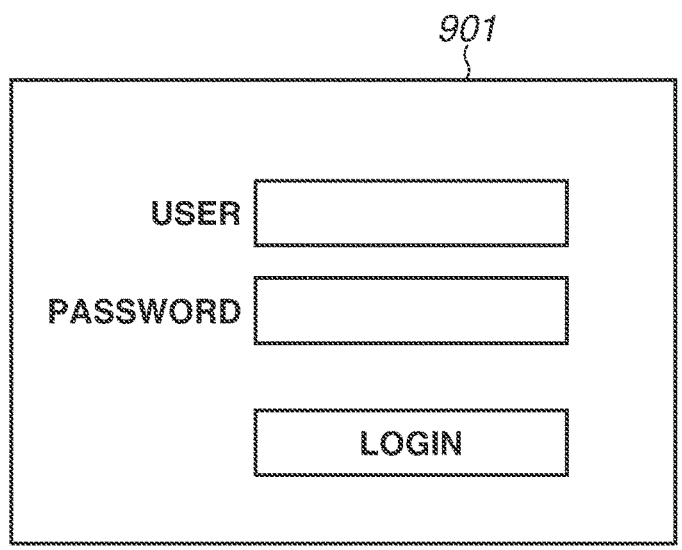
FIGS. 9A to 9C each illustrate an example of a screen to be displayed on an operation screen of the image forming apparatus.
Figure 9B:
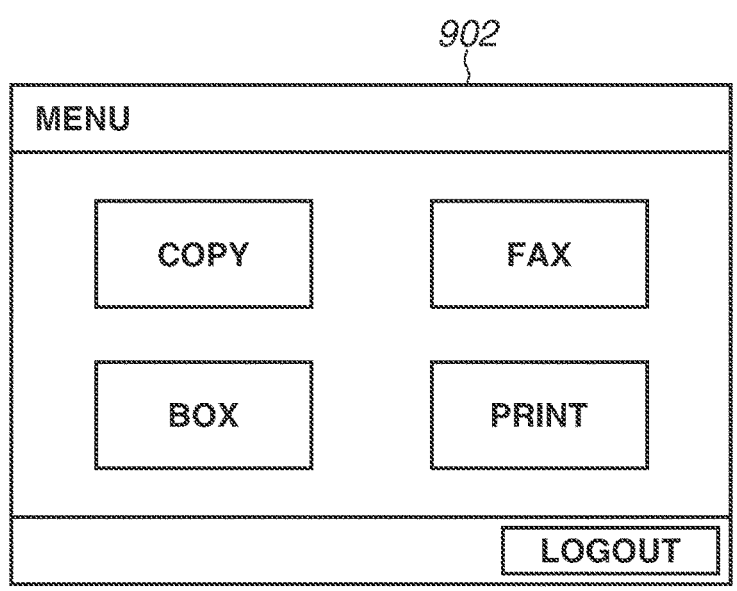

FIG. 9B illustrates an example of a menu screen of the image forming apparatus 110.

In step S704, the CPU 2111 instructs the screen control unit 323 to display a menu screen. More specifically, the screen control unit 323 displays a menu screen 902 for selecting a desired function such as the copy function, so that the user can operate any of the functions provided by the image forming apparatus 110.

Figure 9C:
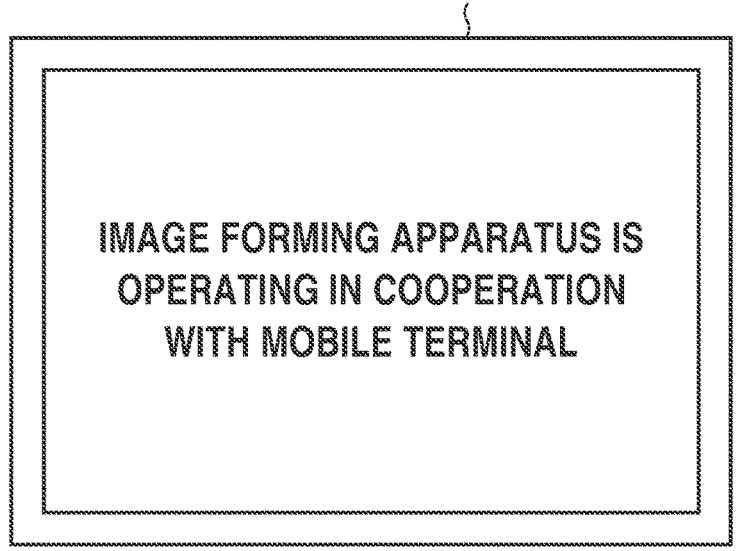

FIG. 9C illustrates an example of a screen indicating that the image forming apparatus 110 is operating in cooperation with the mobile terminal 100.

In step S705, the CPU 2111 instructs the screen control unit 323 to display a specific screen. The specific screen described herein refers to a screen of the image forming apparatus 110 indicating that the image forming apparatus 110 is operating in cooperation with the mobile terminal 100. In step S705, the CPU 2111 executes the received screen processing data, for example, a print job. At this time, a screen 903 indicating that the job transmitted from the mobile terminal 100 is being executed, i.e., a screen indicating that the image forming apparatus 110 is operating in cooperation with the mobile terminal 100, is displayed on the entire screen of the image forming apparatus 110 to prevent the display of the menu screen 902 for selecting the functions provided by the image forming apparatus 110. Instead of displaying the screen indicating that the image forming apparatus 110 is operating in cooperation with the mobile terminal 100, a screen for displaying the job being executed may be displayed.

FIG. 9A illustrates an example of an authentication information input screen of the image forming apparatus 110.

In step S706, the CPU 2111 instructs the screen control unit 323 to display the authentication information input screen. More specifically, an authentication information input screen 901 for authenticating the user name and the password is displayed.

As described above, the information processing system according to the present exemplary embodiment includes the mobile terminal 100 configured to perform a wireless communication including a short-range wireless communication, the image forming apparatus 110 connected to a network, and the NFC tag 111 as a near field communication tag that stores information about the network.

In a case where the mobile terminal 100 is brought close to the NFC tag 111 of the image forming apparatus 110 while the mobile application 300 is being executed in the background state, the mobile terminal 100 transmits the authentication information to issue a login instruction to the image forming apparatus 110. This configuration enables the operator that performs the NFC touch on the lock screen 801 to smoothly transition to the operation screen of the image forming apparatus 110.

In the above-described exemplary embodiment, the example where the mobile terminal 100 performs a handover by reading data from the NFC tag 111 included in the image forming apparatus 110, and then issues a login instruction or a printing instruction to the image forming apparatus 110 has been described. However, the communication method is not limited thereto. For example, in response to a Bluetooth® communication, which is a short-range wireless communication, being established between the image forming apparatus 110 and the mobile terminal 100, a login instruction or a printing instruction may be issued via Bluetooth® communication.

The above-described exemplary embodiments of the present disclosure can also be implemented by processing in which a program for implementing one or more functions according to the above-described exemplary embodiments is supplied to a system or an apparatus via a network or a storage medium, and one or more processors in a computer of the system or the apparatus read out the program and execute the program. The exemplary embodiments of the present disclosure can also be implemented by a circuit (e.g., an application specific integrated circuit (ASIC)) for implementing one or more functions according to the above-described exemplary embodiments.

While exemplary embodiments have been described, the present disclosure is not limited only to the above-described exemplary embodiments. The exemplary embodiments may be modified or changed within the scope of the present disclosure, and the exemplary embodiments and modified examples may be combined as appropriate.

In the above-described exemplary embodiments, the access point 120 connects to the image forming apparatus 110 via a wireless LAN to relay communication. Alternatively, wired communication may be performed using a LAN cable or the like.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-154019, filed Sep. 14, 2020, which is hereby incorporated by reference herein in its entirety.

What is claimed is:

1. A method for controlling a system that includes an external device and an information processing apparatus, the information processing apparatus being configured to communicate with the external device and to execute an application, the method comprising:
   transmitting, by the information processing apparatus, a login request for logging into the external device to the external device, based on a short-range wireless communication being established between the information processing apparatus and the external device in a state where the application is operating in a background state on the information processing apparatus; and
   displaying, by the external device, a menu screen that includes an item for execution of a function provided by the external device without displaying a login screen for receiving an input of authentication information when the login request is received.

2. The method according to claim 1, further comprising storing user information for logging into the external device, wherein the login request includes the stored user information.

3. The method according to claim 1, wherein the state where the application is operating in the background state on the information processing apparatus includes a state where the information processing apparatus is locked.

4. The method according to claim 1, wherein, based on the application being operating in a foreground on the information processing apparatus, instruction information for causing the external device to perform processing that is based on a screen being displayed on the application is transmitted to the external device.

5. The method according to claim 1, wherein the short-range wireless communication is a Bluetooth® communication.

6. The method according to claim 1, wherein the short-range wireless communication is a near field communication (NFC).

7. The method according to claim 1, wherein in a case where the login request is to be transmitted, a wireless local area network (LAN) communication is established with the external device based on the short-range wireless communication, and the login request is transmitted via the wireless LAN communication.

8. The method according to claim 1, wherein, in a case where the external device receives the login request, the external device executes the login processing without receiving an input of authentication information by a user via the login screen and displays the menu screen.

9. The method according to claim 1, wherein, in a case where a short-range wireless communication is established between the information processing apparatus and the external device in a state where the application is operating in a foreground on the information processing apparatus, the external device displays a specific screen without displaying the login screen and the menu screen.

10. The method according to claim 4, wherein the specific screen is a screen indicating operation currently in cooperation with the information processing apparatus.

11. The method according to claim 4, wherein the specific screen is a screen indicating a job whose processing is currently being executed.

12. A system comprising:
   an external device; and an information processing apparatus configured to communicate with the external device and to execute an application,
wherein the information processing apparatus transmits a login request for logging into the external device to the external device, based on a short-range wireless communication being established between the information processing apparatus and the external device in a state where the application is operating in a background state on the information processing apparatus, and
wherein the external device displays a menu screen displaying a function provided by the external device without displaying a login screen for receiving an input of authentication information when the login request is received.

13. The system according to claim 12, user information for logging into the external device is stored,
wherein the login request includes the stored user information.

14. The system according to claim 12, wherein the state where the application is operating in the background state on the information processing apparatus includes a state where the information processing apparatus is locked.

15. The system according to claim 12, wherein, based on the application being operating in a foreground on the information processing apparatus, instruction information for causing the external device to perform processing that is based on a screen being displayed on the application is transmitted to the external device.

16. The system according to claim 12, wherein the short-range wireless communication is a Bluetooth® communication.

17. The system according to claim 12, wherein the short-range wireless communication is a near field communication (NFC).

18. The system according to claim 12, wherein in a case where the login request is to be transmitted, a wireless local area network (LAN) communication is established with the external device based on the short-range wireless communication, and the login request is transmitted via the wireless LAN communication.

19. The system according to claim 12, wherein, in a case where the external device receives the login request, the external device executes the login processing without receiving an input of authentication information by a user via the login screen and displays the menu screen.

20. The system according to claim 12, wherein, in a case where a short-range wireless communication is established between the information processing apparatus and the external device in a state where the application is operating in a foreground on the information processing apparatus, the external device displays a specific screen without displaying the login screen and the menu screen.

21. The system according to claim 15, wherein the specific screen is a screen indicating operation currently in cooperation with the information processing apparatus.

22. The system according to claim 15, wherein the specific screen is a screen indicating a job whose processing is currently being executed.

23. A printer configured to perform operations comprising:
receiving a login request for logging into the printer from an information processing apparatus in a case where a wireless communication is established between the information processing apparatus and the printer in a state where an application is operating in a background state; and
displaying a menu screen that includes an item for execution of a function provided by the printer without displaying a login screen for receiving an input of authentication information when the login request is received.

24. The printer according to claim 23, further comprising: in a case where the application is operating in a foreground on the information processing apparatus, receiving, from the information processing apparatus, instruction information for causing the external device to perform processing that is based on a screen being displayed on the application.

25. The printer according to claim 24, further comprising: displaying a specific screen without displaying the login screen and the menu screen in a case where the instruction information is received.

26. The printer according to claim 25, wherein the specific screen is a screen indicating operation currently in cooperation with the information processing apparatus.

27. The printer according to claim 25, wherein the specific screen is a screen indicating a job whose processing is currently being executed.

28. The printer according to claim 23, wherein the wireless communication is a Bluetooth® communication.

29. The printer according to claim 23, wherein the wireless communication is a near field communication (NFC).

30. The printer according to claim 23, wherein, in a case where the login request is to be received, a wireless local area network (LAN) communication is established with the information processing apparatus based on the wireless communication, and the login request is received via the wireless LAN communication.

* * * * *